Nov. 17, 1925.
G. W. KERR
1,561,726
ADJUSTABLE DOVETAIL
Filed Jan. 7, 1924
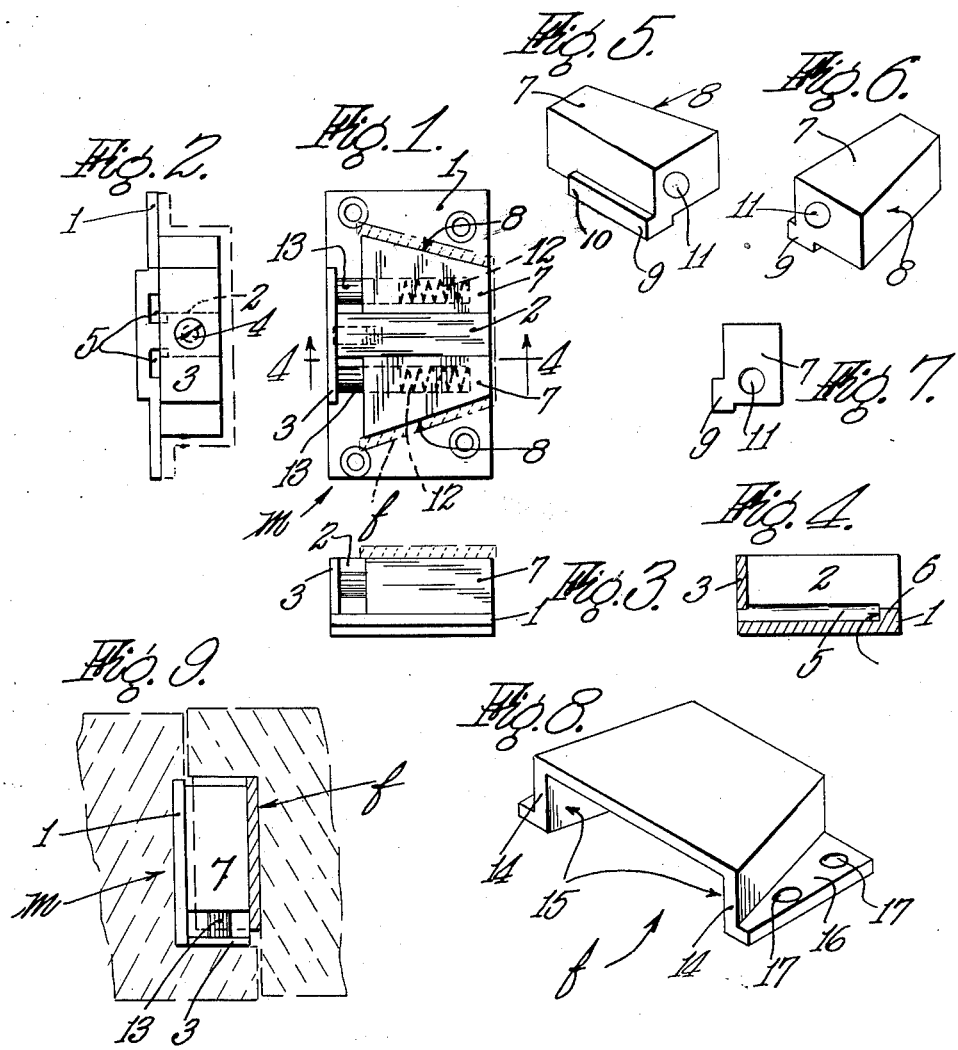
INVENTOR
George W. Kerr
BY Chapin & Neal
ATTORNEYS Patented Nov. 17, 1925.

1,561,726

UNITED STATES PATENT OFFICE.

GEORGE W. KERR, OF SPRINGFIELD, MASSACHUSETTS.

ADJUSTABLE DOVETAIL.

Application filed January 7, 1924. Serial No. 684,764.

*To all whom it may concern:*

Be it known that I, GEORGE W. KERR, a citizen of the United States, residing at Springfield, in the county of Hampden and State of Massachusetts, have invented new and useful Improvements in Adjustable Dovetails, of which the following is a specification.

This invention relates to improvements in self-adjusting dovetails, particularly, to the type known as door anti-rattlers.

The invention is capable of application generally wherever it is desired to prevent or control the relative movement of two closely adjacent members, although the invention is particularly adapted for use in connection with the doors of vehicles, such as automobiles.

Automobile doors, due to the vibration of the vehicle and the necessary play in their hinges, are necessarily inclined to rattle and rumble, and this action, if allowed to continue, results in wear in the hinges and increased rattling.

Devices heretofore known and used as anti-rattlers usually comprise a rigid member in engagement with resilient members. Such devices tend to avoid the vibrations rather than to effectively eliminate them and the resilient members become worn and by long usage lose their resiliency and the device consequently ceases to function efficiently as an anti-rattling device.

One object of my invention is the provision of an interengaging wedge and socket that is adapted to take up and compensate for the wear in its parts.

Another object of the invention is the provision of an unyielding wedge that is rigidly constructed and that will firmly engage a rigid coacting socket.

A further object is the provision of a wedge that bears against the socket in such a manner that the latch of a door is held firmly against the striking plate of the door fastening or locking means.

Other objects and advantages will be apparent from the following description of the invention and illustrated by the accompanying drawings, in which:

Fig. 1 is a plan view of the device;

Fig. 2 is a side elevational view of the same;

Fig. 3 is an end elevational view of the same;

Fig. 4 is a cross-sectional view taken on the line 4—4 of Fig. 1;

Figs. 5 and 6 are perspective views of one of the wedge members;

Fig. 7 is an end elevational view of one of the wedge members;

Fig. 8 is a perspective view of the wedge engaging socket; and

Fig. 9 is a sectional view through an automobile door and adjacent post showing the wedge and socket in interengaging relation.

The device comprises generally a male wedge or dovetail member *m* and a female socket member *f*, either of which may be properly secured to either the post or door of a vehicle, as desired.

The male wedge member *m* comprises a plate 1 having a central transverse bar or tongue 2 that is suitably fixed to the plate 1, as by screws or the like, or it may be made integral therewith, if desired. An abutment plate 3 is fixed to the end of the bar 2 by means of a screw 4 and, as will be seen, the said abutment extends or projects from either side of said bar while its outer face is preferably flush with the rear side edge of the plate 1. Splines or guideways 5 are provided in the plate that are located adjacent the sides of the bar 2 and that extend to the stop portions 6, as best shown in Fig. 4.

Wedges 7, preferably of rigid construction, are provided adjacent either side of the bar 2 that have inclined outer faces or sides 8 that together form a tapering or converging wedge. Guides 9 are provided on the under side of the said wedges 7 that slidably interfit the guideways 5 of the plate. These guides 9 terminate at a distance from the thin or narrow end of the wedges 7 as best shown in Fig. 5 and are adapted to abut the stops 6 at the point indicated at 10 in Fig. 5, thus limiting the movement of the wedges with respect to the plate 1.

Cylindrical recesses 11 are provided in the thick or wide end of each of the wedges that receive compression springs 12 and plungers 13. The plungers and springs are interposed between the abutment plate 3 and wedges and hold the said wedges against their respective stops 6.

While I have shown guides and guideways of a particular construction, it will be readily obvious that other means may be employed to guide and limit the said wedges in their independent transverse movements on the plate.

The socket *f* preferably comprises a rigid U-shaped member having tapered or converging side walls 14, the inner surfaces 15 of which are adapted to engage the converging sides of the wedge members 7 when pressed against the stops by the beforementioned springs. Flanges 16, integral with the side walls and extending angularly therefrom, are provided with screw holes 17 for fastening the socket to a door or post as may be desired.

The operation of the device will be explained in connection with the door and post of an automobile. For the purposes of description, it will be assumed that the female member *f* is secured to the post and the male member *m* to the door of an automobile, although this arrangement may be reversed, if desired.

At such times as the door is unlatched and in an open relation, the wedges 7 are held forwardly of the plate and against the stops by the springs and plungers, as shown in Fig. 1. As the door is moved to its closed position and preferably before it reaches its completely closed position, the tapered socket walls and tapering sides of the wedges are brought into engagement and move transversely of the plate against the action of the springs, which tend to hold the wedges snugly against the sides of the socket.

The device is preferably so constructed and located upon the door and post that the wedges do not strike the abutment 3 but permit a slight overthrow of the door in order to allow the latching mechanism, usually carried by the door and post, to operate.

Although not shown, the latching mechanism ordinarily comprises a spring pressed latch member that rides upon a striking plate during the closing of the door, the said latch member being adapted to fall behind the striking plate to hold the door in its closed position.

The spring pressed wedges function by their engagement with the socket to force the door outwardly so that the latch is held against the rear of the striking plate and prevents a relative movement of the latch and striking plate. Also, the spring pressed wedges fit snugly within the socket and prevent a vertical movement of the door and consequently a rattling of the same.

It will be readily obvious that any wear upon the coacting surfaces of the wedges or socket is easily taken up by reason of the spring pressed wedges and that since the wedges are movable independently that the door is efficiently aligned with the post during the final closing movement. The door may sag and, if so, the lower wedge will strike the lower wall of the socket before the upper wedge strikes its wall and the lower wedge can yield independently of the upper wedge until the latter engages its wall. The wedges, therefore, are self-adjusting in the socket.

The wedges and socket when in engagement are incapable of a relative lateral movement and, as the door assumes its latched position, the spring pressed wedges follow the socket to provide a rigid wedge that is unyieldable laterally and that is firmly embraced by a non-yieldable socket.

While I have described my invention in the form at present preferred, it will be readily obvious that many changes may be made in its construction to adapt it for other uses without departing from the scope of the invention.

What I claim is:—

1. A self-adjusting dovetail comprising, a socket having inwardly converging walls, and a dovetail member adapted to be moved relatively thereto in a certain path into engagement therewith, said dovetail including a plate having a wedge guided therein adapted to move in a plane parallel to said path.

2. A self-adjusting dovetail comprising, a socket having inwardly converging walls and a member adapted to be moved relatively thereto in a certain path into engagement therewith, said member including a plate having wedges guided therein adapted to move relative thereto in a plane parallel to said path.

3. A self-adjusting dovetail comprising in combination, a socket having diverging sides, a dovetail member having a plate provided with a central transverse bar, wedge members guided in said plate and having diverging sides adapted to be engaged by the socket and moved independently and transversely of the plate.

4. A self adjusting dovetail comprising in combination, a socket having diverging sides, a dovetail member having a plate provided with a central transverse bar, wedge members guided in said plate and having diverging sides adapted to be engaged by the socket and moved independently and transversely of the plate, and means associated with the plate and wedges tending to hold the wedges into engagement with the socket.

5. A self-adjusting dovetail comprising in combination, a socket, a dovetail member having a plate provided with independent guideways, stops at the ends of said guideways, wedges provided with guides in engagement with said guideways, an abutment carried by said plate, and springs interposed between said wedges and abutment tending to move the wedges against the said stops.

6. A self-adjusting dovetail comprising in combination, a socket having diverging sides, a dovetail member having a plate provided with independent guideways, stops at the ends of the guideways, wedges having diverging sides and provided with guides slidable in said guideways, an abutment carried by said plate, and springs interposed between said wedges and abutment tending to move the wedges against the said stops.

7. A self-adjusting dovetail comprising in combination, a socket having diverging sides, a dovetail member having a plate provided with a transverse bar and guideways adjacent the sides of said bar, stops at one end of said guideways, an abutment carried by the bar at the other end of said bar, wedges having diverging sides and provided with guides in engagement with the guideways, springs interposed between the abutment and the wedges tending to move the wedges against the said stops.

8. A self-adjusting dovetail comprising, male and female members movable the one relatively to the other in a certain path into engagement, the male member having converging sides and the female member having correspondingly formed sides to contact with the first named sides, the sides of one of said members being formed on independently movable parts which are yieldable in the direction of movement of said parts, but non-yieldable in a direction transversely thereto, whereby when said members become out of line and one side of one contacts with the corresponding side of the other before contact is established between the other sides one of the first named sides will yield until contact is established between the other named sides.

9. A self-adjusting dovetail comprising, male and female members movable relatively one to the other in a certain path into engagement, the said members having correspondingly formed sides for contacting one with the other and the sides of one of said members being formed on a part that is yieldable in the direction of said certain path but non-movable in a path transversely thereto.

In testimony whereof I have affixed my signature.

GEORGE W. KERR.